United States Patent [19]

Abe et al.

[11] Patent Number: 5,543,486

[45] Date of Patent: Aug. 6, 1996

[54] EPOXY-RESIN COMPOSITION CONTAINING TITANIUM AND/OR ZIRCONIUM ALKOXIDE AND LATENT HARDENER

[75] Inventors: Chikara Abe; Junji Ohashi; Kiyomiki Hirai, all of Kawasaki, Japan

[73] Assignee: Ajinomoto Co., Inc., Tokyo, Japan

[21] Appl. No.: 369,651

[22] Filed: Jan. 6, 1995

[30] Foreign Application Priority Data

Jan. 7, 1994 [JP] Japan ................................. 6-000419

[51] Int. Cl.$^6$ ........................... C08G 59/68; C08G 59/18
[52] U.S. Cl. ........................... 528/92; 528/361; 528/407; 525/113; 525/504; 525/525
[58] Field of Search ..................... 525/526, 113, 525/504; 528/92, 361, 407

[56] References Cited

U.S. PATENT DOCUMENTS

| | | | |
|---|---|---|---|
| 2,767,158 | 10/1956 | Schlenker et al. | 528/92 |
| 3,385,835 | 5/1968 | Kugler et al. | 528/365 |
| 4,360,649 | 11/1982 | Kamio et al. | 525/484 |
| 4,558,076 | 12/1985 | Wright et al. | 523/442 |
| 5,200,494 | 4/1993 | Kubota et al. | 528/111 |
| 5,219,956 | 6/1993 | Fukuoka | 525/526 |

FOREIGN PATENT DOCUMENTS 1419754  10/1965  France.

OTHER PUBLICATIONS

Derwent Abstracts 88–303701, "Curable Resin Composition".
Derwent Abstracts 85–200907, "Room Temperature Curing Coating Composition".
Patent Abstracts of Japan, vol. 13 No. 487 (C–649), Nov. 6, 1989, JP–1–190725, Jul. 31, 1989.
Patent Abstracts of Japan, vol. 6, No.. 244 (C–138), Dec. 2, 1982, JP–57–145121, Sep. 8, 1982.
Patent Abstracts of Japan, vol. 15, No. 403 (C–0875), Oct. 15, 1991, JP–3–166284, Jul. 18, 1991.
Database WPI, Derwent Publications, AN–82–27072E, JP–57–034118, Feb. 24, 1984.

*Primary Examiner*—Frederick Krass
*Attorney, Agent, or Firm*—Oblon, Spivak, McClelland, Maier, & Neustadt, P.C.

[57] ABSTRACT

An epoxy-resin composition containing, as essential components, (1) an epoxy resin having two or more epoxy groups in one molecule, (2) a solid-dispersing, amine adduct-type latent hardener, and (3) a titanium and/or zirconium alkoxide(s).

6 Claims, No Drawings

EPOXY-RESIN COMPOSITION CONTAINING TITANIUM AND/OR ZIRCONIUM ALKOXIDE AND LATENT HARDENER

BACKGROUND OF THE INVENTION

1. Field of the Invention

The present invention relates to a one-liquid-type epoxy-resin composition. More precisely, it relates to a one-liquid-type epoxy-resin composition with excellent storage stability, which can be rapidly cured under heat to give a cured resin with excellent properties.

2. Description of the Background

Epoxy resins are cured with an acid-anhydride-type hardener, a polyamine-type hardener, or the like to give cured resins having excellent electrical, mechanical and chemical properties. These resins are used in the various fields of electric insulating materials, the preparation of various shaped products, adhesives, coating compositions, and the like. Epoxy resin compositions which are generally used at present are of a two-component type comprising a base component consisting essentially of an epoxy resin and a hardener component consisting essentially of an acid anhydride, a polyamine compound, or the like. Two-component-type epoxy-resin compositions can be cured at room temperature or at low temperatures, while, on the other hand, the pot life of a resin mixture which is prepared when mixing the two components is limited. Therefore, workers must prepare the compositions freshly each time they are needed. The preparation of the compositions requires troublesome processing which requires precision in weighing the components and mixing and stirring the ingredients. Consequently, the workability of the compositions is often poor. In addition, such operations often cause errors. Moreover, since the remainder of the composition cannot be stored as it is, it must be discarded, which represents a waste of material. Thus, compositions of this type have various disadvantages.

In order to overcome these drawbacks, some one-liquid type epoxy-resin compositions have been proposed in the past. For instance, one proposed epoxy-resin composition contains a latent hardener such as dicyandiamides, dibasic acid dihydrazides, boron trifluoride-amine adducts, guanamines, melamines, and the like. However, dicyandiamides, dibasic acid dihydrazides and guanamines are defective in that they require high temperatures of 150° C. or higher in order to cure, as well as long periods of time for the epoxy resins to cure. However, the compositions have good storage stability. Boron trifluoride-amine adducts can not be said to be practically useful, because they have high moisture absorptability and because they have a negative influence on the properties of the cured resins. Further, they corrode metals. In view of the current state-of-the-art as described above, it has been desirable to provide epoxy-resin compositions that have both good storage stability at room temperature and rapid curability and which can be cured to give cured products having excellent properties.

In order to overcome the above-mentioned problems, methods have been proposed for using, as the hardener, a so-called solid-dispersing, amine-adduct-type latent hardener. Such a hardener can be obtained, for example, by reacting various amine compounds with epoxy compounds, or the like by an addition reaction. For example, such a hardener can be obtained by reacting a dialkylamine and an epoxy resin, as proposed in Japanese Patent Laid-Open Nos. 56-155222 and 57-100127. Another method of preparing the hardener is melt-masking a reaction product obtained from an N,N-dialkylaminoalkylamine and an epoxy resin with a polyphenol compound as proposed in Japanese Patent Laid-Open No. 61-228018. Still another method of preparing the hardener is by making a powdery amine having a tertiary amino group kept in contact with a polyisocyanate as proposed in Japanese Patent Publication No. 3-70736. Yet another method of preparing the hardener is by reacting an N,N-dialkylaminoalkylamine, a cyclic amine having one or two active hydrogens in the molecule and a diisocyanate in the presence of an epoxy resin as the third component, having two or more epoxy groups in one molecule as proposed in Japanese Patent Laid-Open No. 3-296525. Another method of preparing the hardener is by reacting a phenol or alcohol having a tertiary amino group and an epoxy resin as proposed in Japanese Patent Publication No. 1-60164. However, the solid-dispersing latent hardeners obtained by the above-mentioned methods are still not satisfactory for practical use, even though they are curable at low temperature and have storage stability. In addition, their storage stability is noticeably decreased by the epoxy resins to be used or by the presence of additives such as diluents and the like which are added thereto. Thus, these hardeners are not always satisfactory.

In order to further overcome these drawbacks, a composition has been proposed which contains a solid-dispersing latent hardener, of which the surfaces of the particles have been treated with an aluminum alcoholate or a chelated aluminum compound (Japanese Patent Laid-Open No. 63-223027). However, this compound does not have acceptable storage stability.

Given this situation, it has been highly desirable to provide an easy-to-produce, one-liquid-type epoxy-resin composition which has good storage stability and which is rapidly curable at low temperature, without being influenced by the epoxy resins used and by additives such as diluents, and the like which are added thereto, and which can be cured to give cured products having excellent properties.

SUMMARY OF THE INVENTION

Accordingly, one object of the present invention is to provide an easy-to-produce, one-liquid-type epoxy-resin composition which has good storage stability and rapid curability at low temperature, without being negatively affected by the epoxy resins employed by the additives such as diluents and the like, to be added thereto, and which can be cured to give cured products having excellent electric properties, mechanical properties and chemical properties.

Briefly, this object and other objects of the present invention as hereinafter will become more readily apparent can be attained by an epoxy resin composition which comprises (1) an epoxy resin having two or more epoxy groups in one molecule, (2) a solid dispersing, amine adduct type latent hardener, and (3) a titanium and/or zirconium metal alkoxide(s).

DETAILED DESCRIPTION OF THE PREFERRED EMBODIMENT

The present inventors have now found that a one-liquid-type epoxy-resin composition, which contains titanium and/or zirconium metal alkoxide(s), is free from the above-mentioned problems. More specifically, the present invention provides an epoxy resin composition containing, as essential components, (1) an epoxy resin having two or more epoxy groups in one molecule, (2) a solid-dispersing, amine-adduct-type latent hardener, and (3) titanium and/or zirconium metal alkoxide(s).

The epoxy resin to be used in the present invention may be any epoxy resin having two or more epoxy groups on average in one molecule. Suitable epoxy resins include polyglycidyl ethers obtained by reacting polyphenols, such as bisphenol A, bisphenol F, bisphenol AD, catechol, resorcinol, etc., or polyalcohols, such as glycerin, polyethylene glycol, etc., and epichlorohydrin; glycidyl ether esters obtained by reacting hydroxycarboxylic acids, such as p-hydroxybenzoic acid, and β-hydroxynaphthoic acid, and epichlorohydrin; polyglycidyl esters obtained by reacting polycarboxylic acids, such as phthalic acid, terephthalic acid, and epichlorohydrin; and epoxidated phenol-novolak resins, epoxidated cresol-novolak resins, epoxidated polyolefins, alicyclic epoxy resins, and other urethane-modified epoxy resins, etc. However, the present invention is not limited to these epoxy resins.

The solid-dispersing amine-adduct-type latent hardener to be used in the present invention is a solid which is insoluble in epoxy resins at room temperature, while being soluble in epoxy resins with heat, thereby functioning as a hardener. Suitable examples of a hardener of this type, include reaction products from amine compounds and epoxy compounds (amine-epoxy adduct-type hardeners), reaction products from amine compounds and isocyanate compounds or urea compounds (urea adduct type hardeners), and modified products obtained by treating the surfaces of these hardeners with isocyanate compounds or with acid compounds.

Suitable examples of the epoxy compound used as a raw material for producing the latent hardener for use in the present invention include polyglycidyl ethers obtained by reacting polyphenols, such as bisphenol A, bisphenol F, catechol, resorcinol, and the like, or polyalcohols, such as glycerin, polyethylene glycol, and epichlorohydrin; glycidyl ether esters obtained by reacting hydroxycarboxylic acids, such as p-hydroxybenzoic acid, p-hydroxynaphthoic acid, and epichlorohydrin; polyglycidyl esters obtained by reacting polycarboxylic acids, such as phthalic acid, terephthalic acid, and epichlorohydrin; glycidylamine compounds to be obtained from 4,4'-diaminodiphenylmethane, m-aminophenol, and the like; polyfunctional epoxy compounds such as epoxidated phenol-novolak resins, epoxidated cresol-novolak resins, epoxidated polyolefins, and the like; monofunctional epoxy compounds such as butyl glycidyl ether, phenyl glycidyl ether, glycidyl methacrylate, and the like. However, the present invention is not limited to these compounds.

The amine compound used as the raw material for producing the latent hardener of the present invention is one which has, in one molecule, one or more active hydrogen atoms which are capable of reacting with an epoxy group or an isocyanate group by the addition reaction and which has, in one molecule, at least one or more substituents selected from primary amino groups, secondary amino groups and tertiary amino groups. Examples of the amine compound of this type are mentioned below, which, however, are not intended to limit the scope of the present invention.

Suitable examples of primary and secondary amines having tertiary amino group(s) in the molecule include amine compounds such as diethylenetriamine, triethylenetetramine, n-propylamine, 2-hydroxyethylaminopropylamine, cyclohexylamine, dimethylaminopropylamine, dibutylaminopropylamine, dimethylaminoethylamine, diethylaminoethylamine, N-methylpiperazine, and the like, and imidazole compounds such as 2-methylimidazole, 2-ethylimidazole, 2-ethyl-4-methylimidaozle, 2-phenylimidazole, and the like; as well as alcohols, phenols, thiols, carboxylic acids, hydrazides, and the like, having tertiary amino group(s) in the molecule, such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-phenylimidazoline, 2-(dimethylaminomethyl)phenol, 2,4,6-tris(dimethylaminomethyl)phenol, N-β-hydroxyethylmorpholine, 2-dimethylaminoethanethiol, 2-mercaptopyridine, 2-mercaptobenzimidazole, 2-mercaptobenzothiazole, 4-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic acid hydrazide, nicotinic acid hydrazide, isonicotinic acid hydrazide, and the like.

In preparing the latent hardener for use in the present invention by reacting the above-mentioned epoxy compound and amine compound by an addition reaction, an active hydrogen compound having two or more active hydrogens in one molecule can be added to the reaction system as the third component. Suitable examples of the active hydrogen compound include polyphenols such as bisphenol A, bisphenol F, bisphenol S, hydroquinone, catechol, resorcinol, pyrogallol, phenol-novolak resins, and the like; polyalcohols such as trimethylolpropane, and the like; amines such as triethylenetetramine, cyclohexylamine, piperazine, aniline, and the like; polycarboxylic acids such as adipic acid, phthalic acid, and the like; as well as 1,2-dimercaptoethane, 2-mercaptoethanol, 1-mercapto-3-phenoxy-2-propanol, mercaptoacetic acid, anthranilic acid, lactic acid, and the like. However, the present invention is not limited to these.

Suitable examples of the isocyanate compound used for preparing the latent hardener for use in the present invention include monofunctional isocyanate compounds such as n-butyl isocyanate, isopropyl isocyanate, phenyl isocyanate, benzyl isocyanate, and the like; polyfunctional isocyanate compounds such as hexamethylene diisocyanate, toluylene diisocyanate, 1,5-naphthalene diisocyanate, diphenylmethane-4,4'-diisocyanate, isophorone diisocyanate, xylylene diisocyanate, p-phenylene diisocyanate, 1,3,6-hexamethylene triisocyanate, bicycloheptane triisocyanate, and the like. In addition, also usable are terminal isocyanate group-containing compounds, which include compounds obtained by reacting polyfunctional isocyanate compounds and active hydrogen compounds. Suitable examples of such compounds include terminal isocyanate group-containing adducts obtained by the reaction of toluylene diisocyanate and trimethylolpropane; terminal isocyanate group-containing adducts obtained by reaction of toluylene diisocyanate and pentaerythritol, and the like. However, the present invention is not limited to these compounds.

The latent hardener for use in the present invention can be obtained easily by mixing (a) an epoxy compound or isocyanate compound and (b) an amine compound, such as those mentioned above, or by mixing (a) an epoxy compound or isocyanate compound, (b) an amine compound and (c) an active hydrogen compound, such as those mentioned above, and then reacting the mixed materials at temperatures in the range of between room temperature and 200° C., followed by solidifying and grinding the reaction product; or by reacting the components in a solvent such as methyl ethyl ketone, dioxane, tetrahydrofuran or the like, followed by removing the solvent from the reaction product and then grinding the product.

Typical examples of commercial products of the solid-dispersing amine-adduct-type latent hardener for use in the present invention are mentioned below, which, however, do not limit present invention.

Suitable examples of amine-epoxy adduct type hardeners include "Ajicure PN-23" (trade name, produced by Ajinomoto Co.), "Ajicure PN-H" (trade name, produced by Ajinomoto Co.), "Ajicure MY-24" (trade name, produced by Ajinomoto Co.), "Hardener H-3615S" (trade name, produced by ACR Co.), "Hardener H-3293S" (trade name, produced by ACR Co.), "Novacure HX-3721" (trade name, produced by Asahi Chemical Co.), "Novacure HX-3742" (trade name, produced by Asahi Chemical Co.), "Ancamine 2014AS" (trade name, produced by Pacific Anchor Chemical Co.), "Ancamine 2014FG" (trade name, produced by Pacific Anchor Chemical Co.), and the like. Suitable examples of urea-type adducts include "Fujicure FXE-1000" (trade name, produced by Fuji Chemical Co.), "Fujicure FXE-1030" (trade name, produced by Fuji Chemical Co.), and the like.

Suitable examples of the titanium metal alkoxides include tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, and their oligomers, and the like, which, however, are not intended to limit the present invention. Of these, especially preferred is tetraisopropyltitanate.

Suitable examples of the zirconium metal alkoxides include tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate, and their oligomers, and the like, which, however, are not limiting with respect to the present invention.

The amount of these metal alkoxides present in the epoxy resin composition of the present invention is from 0.1 to 10 parts by weight, preferably from 0.1 to 5 parts by weight, per 100 parts by weight of the epoxy resin in the composition. This is because, if the amount is too small, the storage stability of the composition is lowered, but, on the contrary, if it is too large, the curing speed of the epoxy resin in the composition is lowered.

The epoxy-resin composition of the present invention may contain, if desired, various additives such as a filler, diluent, solvent, pigment, flexibility-imparting agent, coupling agent, antioxidant, or the like.

The cured products obtained by curing the composition of the present invention have excellent properties and, therefore, the composition of the present invention can be used in various fields such as for adhesives, coating materials, electrical-insulating materials, laminated structures, and the like, because of the excellent properties that the curing gives.

Having generally described this invention, a further understanding can be obtained by reference to certain specific examples which are provided herein for purposes of illustration only and are not intended to be limiting unless otherwise specified.

In the following examples, samples were stored in a thermostat at a pre-determined temperature (40° C.), while the number of days was counted before each of the stored samples lost its fluidity, thereby determining the storage stability of each sample. The gelling time of each sample was measured at 80° C. or 100° C. using a Yasuda Gel Timer, thereby determining the curability of each sample. The viscosity of each sample was measured according to JISK 6833. In these examples, parts are parts by weight.

EXAMPLES 1 to 6

To 100 parts of bisphenol-F-type epoxy resin "Epikote (EP)-807" (trade name, produced by Yuka-Shell Epoxy Co.), were added 20 parts of "Ajicure PN-23" and 1 part of Aerosil 200 (trade name, produced by Nippon Aerosil Co. fine particles of silica) and the materials were mixed at room temperature. To the resulting mixture were added, as a metal alkoxide, 1 part of tetraethyltitanate, 1 part of tetra-isopropyltitanate, 1 part of tetra-n-propyltitanate, 1 part of tetra-n-butyltitanate, 1 part of tetra-isopropylzirconate or 2 parts of tetra-isopropyltitanate. The combined particles were mixed at room temperature to obtain epoxy-resin compositions. The gelling times and the storage stabilities of these compositions are shown in Table 1.

COMPARATIVE EXAMPLES 1 and 2

Epoxy-resin compositions were prepared in the same manner as described in Examples 1 to 6, except that one part of mono-s-butoxyaluminum diisopropylate (AMD) was used as the metal alkoxide or no metal alkoxide was added. The compositions were tested in the same manner described above. The results are shown in Table 1.

TABLE 1

|  | EP-807 (parts) | Ajicure PN-23 (parts) | Aerosil 200 (parts) | Metal Alkoxide/ (parts) | Initial Viscosity (ps) | 80° Gelling Time (min) | 100° C. Gelling Time (min) | Storage Stability (40° C.) |
|---|---|---|---|---|---|---|---|---|
| Example 1 | 100 | 20 | 1 | Ti(OEt)4/1 | 125 | 12 | 4 | more than 3 months |
| Example 2 | 100 | 20 | 1 | Ti(OiPr)4/1 | 126 | 12 | 4 | more than 4 months |
| Example 3 | 100 | 20 | 1 | Ti(OPr)4/1 | 126 | 12 | 4 | more than 3 months |
| Example 4 | 100 | 20 | 1 | Ti(OBu)4/1 | 128 | 12 | 4 | more than 3 months |
| Example 5 | 100 | 20 | 1 | Zr(OiPr)4/1 | 128 | 12 | 4 | more than 3 months |
| Example 6 | 100 | 20 | 1 | Ti(OiPr)4/2 | 70 | 12 | 4 | more than 3 months |

TABLE 1-continued

|  | EP-807 (parts) | Ajicure PN-23 (parts) | Aerosil 200 (parts) | Metal Alkoxide/ (parts) | Initial Viscosity (ps) | 80° Gelling Time (min) | 100° C. Gelling Time (min) | Storage Stability (40° C.) |
|---|---|---|---|---|---|---|---|---|
| Comparative Example 1 | 100 | 20 | 1 | AMD*/2 | 118 | 10 | 3 | less than 3 weeks |
| Comparative Example 2 | 100 | 20 | 1 |  | 136 | 11 | 3 | less than 2 weeks |

AMD*: Mono-s-butoxyaluminum Diisopropylate

EXAMPLES 7 and 8

To 80 parts of bisphenol-A-type epoxy resin "EP-828" (trade name, produced by Yuka Shell Epoxy Co.) were added 20 parts of a reactive diluent; and 20 parts of a latent hardener and 1 part of Aerosil 200 were added thereto and mixed. To the resulting mixture was added 1 part of tetra-isopropyl-titanate and mixed at room temperature. Thus, epoxy-resin compositions were obtained. The gelling times and the storage stabilities of these compositions are shown in Table 2.

COMPARATIVE EXAMPLES 3 and 4

20 parts of a reactive diluent were added to 80 parts of "EP-828", and 20 parts of a latent hardener and 1 part of Aerosil 200 were added thereto and mixed at room temperature. Thus, epoxy-resin compositions were obtained. The gelling times and the storage stabilities of these compositions are shown in Table 2.

TABLE 2

|  | Example | | Comparative Example | |
|---|---|---|---|---|
|  | 7 | 8 | 3 | 4 |
| EP-828 | 80 | 80 | 80 | 80 |
| Cardula E | 20 |  | 20 |  |
| EX-201 |  | 20 |  | 20 |
| Fujicure FXE-1000 | 20 |  | 20 |  |
| Ajicure PN-23 |  | 20 |  | 20 |
| Aerosil 200 | 1 | 1 | 1 | 1 |
| Ti(OiPr)$_4$ | 1 | 1 |  |  |
| 80° C. Gelling Time (min) | 9 | 11 | 8 | 10 |
| 100° C. Gelling Time (min) | 4 | 4 | 4 | 3 |
| Storage Stability (40° C.) | more than 2 months | more than 2 months | less than 2 weeks | less than 1 month |

Reactive Diluent
Cardula E:
 Glycidyl Ester of Tertiary Carboxylic Acid (trade name, produced by Yuka Shell Epoxy Co.)
EX-201:

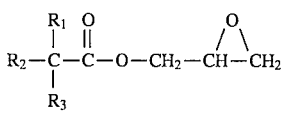

wherein $R_1$, $R_2$ and $R_3$ are saturated alkyl groups, and at least one of them is a methyl group and the total number of carbon atoms in the R groups is 8.
 Diglycidyl Ester of Resorcinol (trade name, produced by Nagase Chemical Co.)

The one-liquid-type epoxy-resin composition of the present invention is obtained by merely adding metal alkoxide(s) to a composition comprising an epoxy resin and a hardener and mixing them at room temperature. The combination of the present invention achieves epoxy resin compositions which are stable upon storage and cure at low temperatures. These properties cannot be satisfactorily realized by conventional epoxy-resin compositions. Specifically, the resin composition of the present invention can be stored stably at 40° C. for 3 months or more and can be cured at from 80° to 100° C. within 15 minutes. In these points, the resin composition of the present invention is much superior to conventional one-liquid-type epoxy-resin compositions that have heretofore been proposed. In addition, since the composition of the present invention contains metal alkoxide(s), it maintains good storage stability even when additives such as diluent, and the like, are present that normally noticeably lower storage stability of the epoxy resin compositions.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. An epoxy-resin composition comprising, as essential components, (1) an epoxy resin having two or more epoxy groups in one molecule, (2) a solid-dispersing, latent hardener which is a reaction product of an amine or urea compound with an epoxy compound, said reaction product being insoluble in epoxy resins at room temperature while being soluble in epoxy resins under heat, and (3) titanium and/or zirconium metal alkoxide(s), said composition having improved storage stability as compared to a composition not containing said titanium and/or zirconium metal alkoxide(s).

2. The epoxy resin composition as claimed in claim 1, in which the amount of said metal alkoxide(s) ranges from 0.1 to 10 parts by weight per 100 parts by weight of the epoxy resin having two or more epoxy groups in one molecule.

3. The epoxy resin composition as claimed in claim 1, wherein the amount of said metal alkoxide(s) ranges from 0.1 to 5 parts by weight per 100 parts by weight of the epoxy resin having two or more epoxy groups in one molelcule.

4. The epoxy resin composition as claimed in claim 1, wherein said titanium alkoxide is tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, or oligomers thereof.

5. The epoxy resin composition as claimed in claim 1, wherein said zirconium alkoxide is tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetratert-hexyl zirconate, tetra-n-heptyl zirconate, tetra-n-octyl zirconate, tetra-n-stearyl zirconate, or oligomers thereof.

6. A method for storage-stabilizing an epoxy-resin composition comprising, as essential components, (1) an epoxy resin having two or more epoxy groups in one molecule, and (2) a solid-dispersing, latent hardener which is a reaction product of an amine or urea compound with an epoxy compound, said reaction product being insoluble in epoxy resins at room temperature while being soluble in epoxy resins with heat, comprising incorporating (3) titanium and/or zirconium metal alkoxide(s) into said epoxy resin composition, said composition having improved storage stability as compared to a composition not containing said titanium and/or zirconium metal alkoxide(s).

* * * * *